United States Patent [19]
Mahoney

[11] 3,834,121
[45] Sept. 10, 1974

[54] EYESHIELD FOR HORSES

[76] Inventor: James G. Mahoney, 439 E. 60th St., Hialeah, Fla. 33013

[22] Filed: June 21, 1973

[21] Appl. No.: 372,172

[52] U.S. Cl. .................................. 54/80, 54/10
[51] Int. Cl. ............................................ B68c 5/00
[58] Field of Search ............ 54/80, 10, 11; 119/104

[56] References Cited
UNITED STATES PATENTS

| | | | |
|---|---|---|---|
| 131,029 | 9/1872 | Rumery | 54/80 X |
| 152,384 | 6/1874 | Kennedy | 54/80 |
| 987,600 | 3/1911 | Rinaldi | 54/11 |

Primary Examiner—Louis G. Mancene
Assistant Examiner—J. Q. Lever

[57] ABSTRACT

A transparent eyeshield, particularly for race horses, fixed relative to the head and nose bands and formed from a piece of clear plastic or any other suitable transparent material. The eyeshield is sized and shaped to be placed relative to the horse's face between the muzzle and cheek areas and is contoured to slope upwardly and outwardly relative to the horse's face. In its preferred form, the upper edge of the eyeshield normally terminates in a horizontal place substantially at or slightly above the bottom portion of the periphery of the eyes of a horse to provide a maximum degree of protection for the eyes while permitting the horse to retain a clear view of a substantial portion of the surrounding territory in spite of mud and dirt thrown onto the eyeshield by other horses.

1 Claim, 3 Drawing Figures

PATENTED SEP 10 1974 3,834,121

EYESHIELD FOR HORSES

STATE OF THE PRIOR ART

Various protective devices have been provided for the eyes of race horses such as the device entitled "Eye Protector" in U.S. Pat. No. 2,871,642 to T. A. Damone. A hood or mask like structure covers a portion of the horses face, provides holes for passage therethrough of the horses ears, and is strapped around his head. Goggle-like openings are provided for the horse's eyes and one or more cup or semi-cup shields are adjustably carried in each opening. However, these cups form perfect receptacles for dirt and mud and could collect same to the extent that the horse could be virtually blinded.

Various other patents such as U.S. Pat. No. 1,005,932 to E. M. Bretz, U.S. Pat. No. 984,017 to G. Moritz, and U.S. Pat. No. 131,029 to S. B. Rumery disclose protective devices for horses eyes which share one or more of the following deficiencies. First, they completely enclose the eyes of the horses which result in a fogging condition on the inner surface of the lenses. Second, they completely cover the horse's eyes in a manner whereby a covering of mud and/or dirt will completely blind the horse and, third, they do not provide proper protection against flying projectiles such as rocks and horseshoes thrown from other horses.

BACKGROUND OF THE PRESENT INVENTION

The present invention pertains to a transparent eyeshield for race horses which is designed to protect the horse's eyes from any foreign objects or matter thrown upwardly by other horses.

More particularly, the eyeshield of the present invention pertains to a device formed from a piece of clear plastic or any other suitable transparent material, fixed relative to the head and nose bands worn by the horse. The eyeshield is shaped and sized to be fitted relative to the horse's face between the muzzle and cheek areas and is contoured to slope upwardly and outwardly relative to the horse's face.

In its preferred form, the upper edge of the eyeshield terminates substantially at or somewhat above the bottom portion of the periphery of the eyes of a horse to provide a maximum degree of protection for the eyes. At the same time, a sufficient degree of visibility is always maintained in spite of mud and dirt thrown onto the eyeshield by other horses.

In the past, many race horses have been injured in varying degrees because they were hit in the eye during the running of a race by, in some cases flying stones, and in other cases, by horseshoes thrown off of horses running in front of them.

On muddy tracks, race horses running behind the leader, often become partially or fully blinded by a collection of mud in their eyes. This condition has resulted in horses becoming panicky, losing their way and at times running into one of the side rails, sometimes resulting in injuries so severe that they had to be destroyed.

The present invention provides an eyeshield which offers a maximum amount of protection from the above described hazards to a race horse while insuring a sufficient scope of visibility for the horse to maintain an awareness of the other horses in the race and the course to be followed.

DETAILED DESCRIPTION OF THE INVENTION

Figure 1:
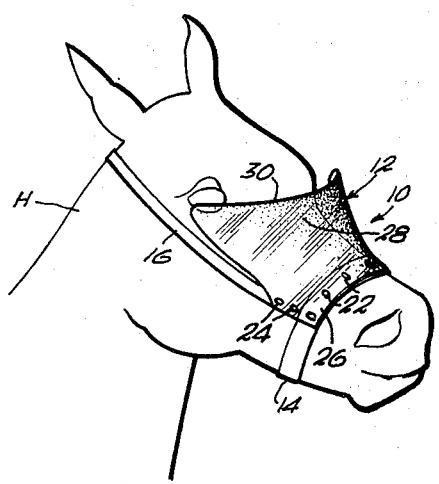
FIG. 1 is a perspective view, looking at the side and front of the head of a horse wearing an eyeshield in accordance with the present invention.
Figure 3:
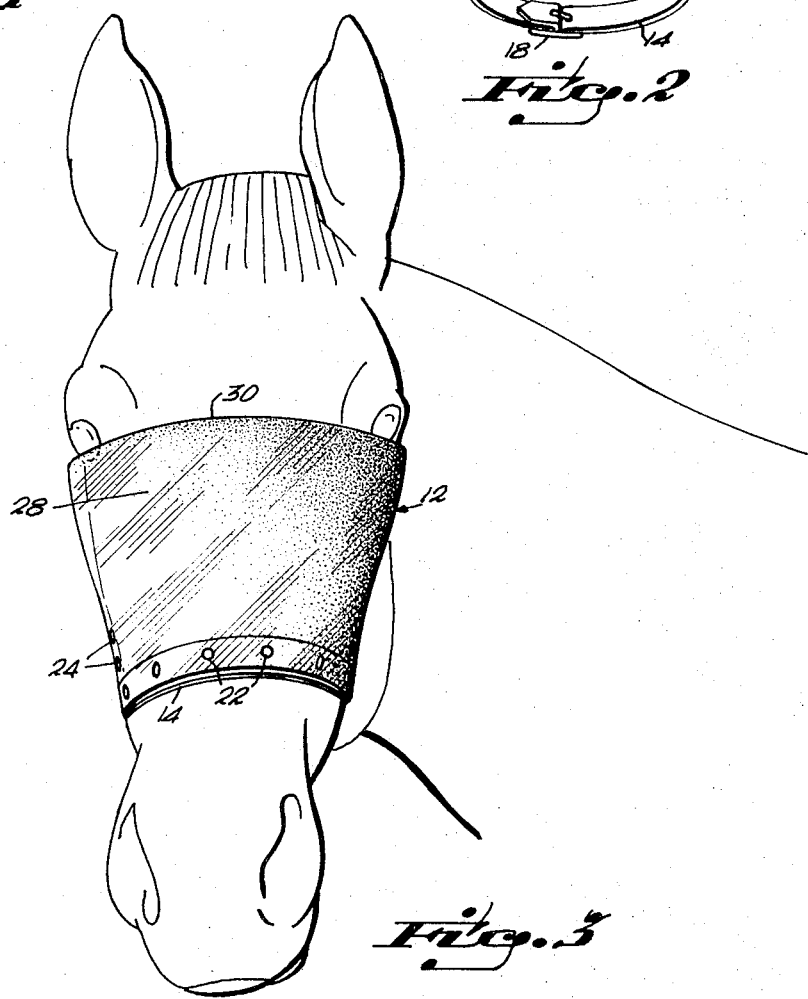
FIG. 3 is a head-on view of a horse wearing the eyeshield.

With reference to the drawings in which like reference numerals designate like or corresponding parts throughout the several views and with particular reference to FIGS. 1 and 3, the reference numeral 10 generally designates a protective eyeshield in accordance with the present invention, positioned on the face of a horse H between the muzzle and cheek areas.

Figure 2:
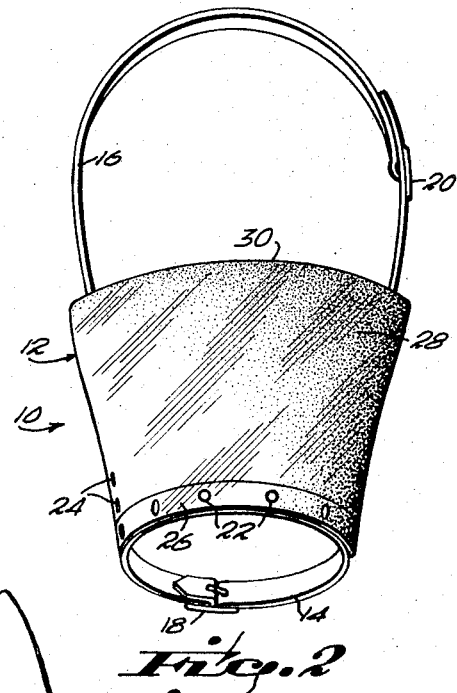
FIG. 2 is a perspective view of the eyeshield attached to head and nose bands.

In its preferred form, the protective eyeshield is comprised of a contoured piece of a suitable transparent material 12 such as plastic, fixed to the nose and head bands 14 and 16 worn by the horse. The nose band 14 is comprised of a leather strap passed around the horse's face and under his jaw between the cheek and muzzle areas thereof. Extending upwardly from the respective sides of the nose band is the head band 16 which passes around the horse's head, behind the ears. As illustrated in FIG. 2, the nose and head bands 14 and 16 are adjustably held in place by respective buckle means 18 and 20. The plastic shield 10 is attached by suitable fastening means, such as the rivets 22 and 24, respectively to the nose band 14 and the opposed end portions of the head band 16.

As best illustrated in FIG. 1, the lower end portion 26 of the shield 10 is contoured to the upper portion of the horse's nose and it is this portion which is fixed to the nose band 14. From the lower end portion 26, the protective shield 10 is flared outwardly and curved or angled upwardly as at 28 in a manner so as to protect the eyes of a horse by deflecting foreign objects and substance away from the horse's eyes. The protective shield 10 terminates in an upper edge 30, preferably positioned even with or slightly above the lower edge of the horse's eyes E.

The adjustability of the nose and head bands 14 and 16, provided by the respective buckle means 18 and 20, makes it possible to adjust the protective eyeshield to each individual horse's head as some horses carry their heads in higher or lower positions than others when running.

Some race horses have a tendency to jump shadows and dark spots on the race track. To overcome this tendency, the transparent protective eyeshield 10 of the present invention may be tinted or otherwise provided with a solid dark color along the lower end zone of the shield. Commonly in use to overcome this tendency is a device called a "shadow roll," made of sheepskin, which prevents the horse from seeing the ground immediately in front of himself. However, the sheepskin shadow roll accumulates mud and water when used in wet track conditions, becoming quite heavy, thus adding additional weight on the horse's head. The protective eyeshield of the present invention, on the other hand, can be utilized to serve the same purpose as a shadow roll, in addition to its protective qualities, but, being non-absorbent, it overcomes the disadvantages of the sheepskin shadow roll.

What is claimed is:

1. A protective eyeshield for race horses comprising:

a piece of suitable contoured transparent plastic material in the rigid range, said piece having an upper edge, normally positioned in a generally horizontal plane substantially on a level with and spaced outwardly of the face of the horse on a line joining the eyes of the horse, and a bottom end portion;

means to attach said bottom end portion of the shield to a horse's face between the muzzle and cheek areas with the upper edge substantially at said plane, said means to attach comprising (a) an adjustable nose band extending from said bottom end portion, of a length adapting the same for passing around the lower portion of the horse's face and under his jaw, and (b) a head band extending from said bottom end portion and of a length adapting the same for passing around the horse's head, behind his ears, said nose band and said head band each having a portion attached to opposing locations on said end portion in the lower face area of the horse, and each band including adjustment means to vary the effective length, said contoured material being flared outwardly on both sides and being contoured upwardly from said bottom end portion to said upper edge defining shield means to deflect foreign objects and matter thrown upwardly from a race track by other horses, and away from the horse's eyes.

* * * * *